(12) United States Patent
Takemura et al.

(10) Patent No.: US 6,691,022 B2
(45) Date of Patent: Feb. 10, 2004

(54) INTAKE AIR QUANTITY MEASUREMENT FOR INTERNAL COMBUSTION ENGINE

(75) Inventors: Shinichi Takemura, Yokohama (JP); Shunichi Aoyama, Kanagawa (JP); Tsuneyasu Nohara, Kanagawa (JP); Takanobu Sugiyama, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 154 days.

(21) Appl. No.: 10/060,312

(22) Filed: Feb. 1, 2002

(65) Prior Publication Data

US 2002/0120384 A1 Aug. 29, 2002

(30) Foreign Application Priority Data

Feb. 27, 2001 (JP) .......................................... 2001-051423

(51) Int. Cl.$^7$ ............................ G05D 1/00; F02D 33/02; F02D 13/02; F02D 41/18
(52) U.S. Cl. ...................... 701/109; 701/114; 73/118.2; 123/90.15
(58) Field of Search .................................. 701/101, 102, 701/103, 109, 110, 111, 114; 123/90.11, 90.15, 90.16, 90.17, 90.18, 399, 478, 480, 494; 73/117.3, 118.1, 118.2

(56) References Cited

U.S. PATENT DOCUMENTS

| | | | |
|---|---|---|---|
| 5,927,252 A | 7/1999 | Atsumi | 123/406.2 |
| 6,039,026 A | 3/2000 | Shiraishi et al. | 123/399 |
| 6,189,512 B1 * | 2/2001 | Kawasaki et al. | 73/118.2 |
| 6,196,197 B1 * | 3/2001 | Yamada et al. | 123/90.15 |
| 6,390,063 B1 * | 5/2002 | Obata et al. | 123/90.11 |
| 6,564,763 B2 * | 5/2003 | Shiraishi et al. | 123/90.15 |

FOREIGN PATENT DOCUMENTS

| | | |
|---|---|---|
| JP | 9-303242 | 11/1997 |
| JP | 11-117777 | 4/1999 |

\* cited by examiner

*Primary Examiner*—Willis R. Wolfe
(74) *Attorney, Agent, or Firm*—Foley & Lardner

(57) ABSTRACT

In an engine capable of continuously controlling an intake air quantity by varying an intake valve operating characteristic, an intake valve lift is sensed as well as an engine speed. Then, an intake air quantity is calculated in accordance with the engine speed and intake valve lift when an engine operating point is in a very low lift state.

18 Claims, 5 Drawing Sheets

FIG.3

| OPERATING STATES | VALVE LIFT CHARACTERISTIC |
|---|---|
| MEDIUM TO HIGH SPEED VERY LIGHT LOAD (INCLUDING IDLE) | LIFT OPERATING ANGLE : VERY SMALL<br>PHASE : MOST RETARDED<br> |
| LIGHT LOAD (INCLUDING ACCESSORY DRIVING IDLE) | LIFT OPERATING ANGLE : VERY SMALL ~ SMALL<br>PHASE : ADVANCED<br> |
| MEDIUM LOAD | LIFT OPERATING ANGLE : SMALL<br>PHASE : MOST ADVANCED<br> |
| HEAVY LOAD LOW SPEED | LIFT OPERATING ANGLE : SMALL ~ MEDIUM<br>PHASE : MOST RETARDED ~ ADVANCED<br> |
| HEAVY LOAD MEDIUM SPEED | LIFT OPERATING ANGLE : MEDIUM<br>PHASE : MOST RETARDED ~ ADVANCED<br> |
| HEAVY LOAD HIGH SPEED | LIFT OPERATING ANGLE : GREAT<br>PHASE : MOST RETARDED ~ ADVANCED<br> |

INTAKE AIR QUANTITY MEASUREMENT FOR INTERNAL COMBUSTION ENGINE

BACKGROUND OF THE INVENTION

The present invention relates to method and/or apparatus for measuring an intake air quantity of an internal combustion engine, and more specifically to intake air quantity measurement for an engine of a type capable of continuously varying intake valve lift and intake valve timing in accordance with engine operating conditions.

Published Japanese Patent Application KOKAI Numbers H9-303242; and H11-117777 show engines of a type for regulating the intake air quantity mainly by altering an intake valve lift characteristic.

SUMMARY OF THE INVENTION

In a gasoline engine, an intake negative pressure or intake vacuum produced by a throttling operation of a throttle valve to restrain load is liable to increase pumping loss (throttle loss) and hence to deteriorate the thermal efficiency and fuel consumption in light load region, as compared to a diesel engine having no throttle valve. This problem can be met by the technique of regulating the intake air quantity by varying the intake valve lift characteristic. When an air flowmeter is needed, however, the addition of the air flowmeter tends to complicate the construction and increase the cost. Moreover, the measurement of intake air quantity is more or less inaccurate due to back flow formed near the air flowmeter in the intake passage by intake pressure fluctuation. By increasing the volume of a collector section on the upstream side of the intake ports of engine cylinders, it is possible to reduce the intake pressure amplitude and restrain the back flow near the air flowmeter. In this case, however, the volume increase of the collector section increases a time from an actual change in the intake air quantity caused by a change in the valve lift characteristic, to a reflective change in the measurement of the air flowmeter. As a result, the measurement of the intake air quantity tends to be less accurate in such a transient state, and the control of the fuel injection quantity and air-fuel ratio based on the intake air quantity measurement tends to be less accurate.

It is an object of the present invention to provide method/system for measuring or controlling intake air quantity, specifically in a very light load engine operating region.

According to the present invention, an intake air quantity measuring method for an engine arranged to continuously control an intake air quantity by varying an intake valve operating characteristic, comprises: sensing an engine speed; sensing an intake valve lift; detecting a very light engine load region; and calculating an intake air quantity in accordance with the engine speed and the intake valve lift when the very light engine load region is detected.

According to the present invention, an intake air quantity measuring apparatus for an engine arranged to continuously control an intake air quantity by varying an intake valve operating characteristic, the intake air quantity measuring apparatus comprises: a first sensor to sense an engine speed; a second sensor to sense an intake valve lift; and a controller programmed to detect a very light engine load region; and to calculate an intake air quantity in accordance with the engine speed and the intake valve lift when the very light engine load region is detected.

According to another aspect of the present invention, an engine control system comprises: means for continuously controlling an intake air quantity of an engine by varying an intake valve operating characteristic; means for sensing an engine speed of the engine; means for sensing an intake valve lift of the engine; means for discriminating a very light engine load region from a remaining engine operating region; means for calculating an intake air quantity in a first control mode in the case of the remaining engine operating region; and means for calculating the intake air quantity in a second control mode in accordance with the engine speed and the intake valve lift in the case of the very light engine load region.

BRIEF DESCRIPTION OF THE DRAWINGS

FIG. 3 is a table illustrating settings of lift operating angle and center phase in various engine operating states, employed in the embodiment.

DETAILED DESCRIPTION OF THE INVENTION

Figure 4:
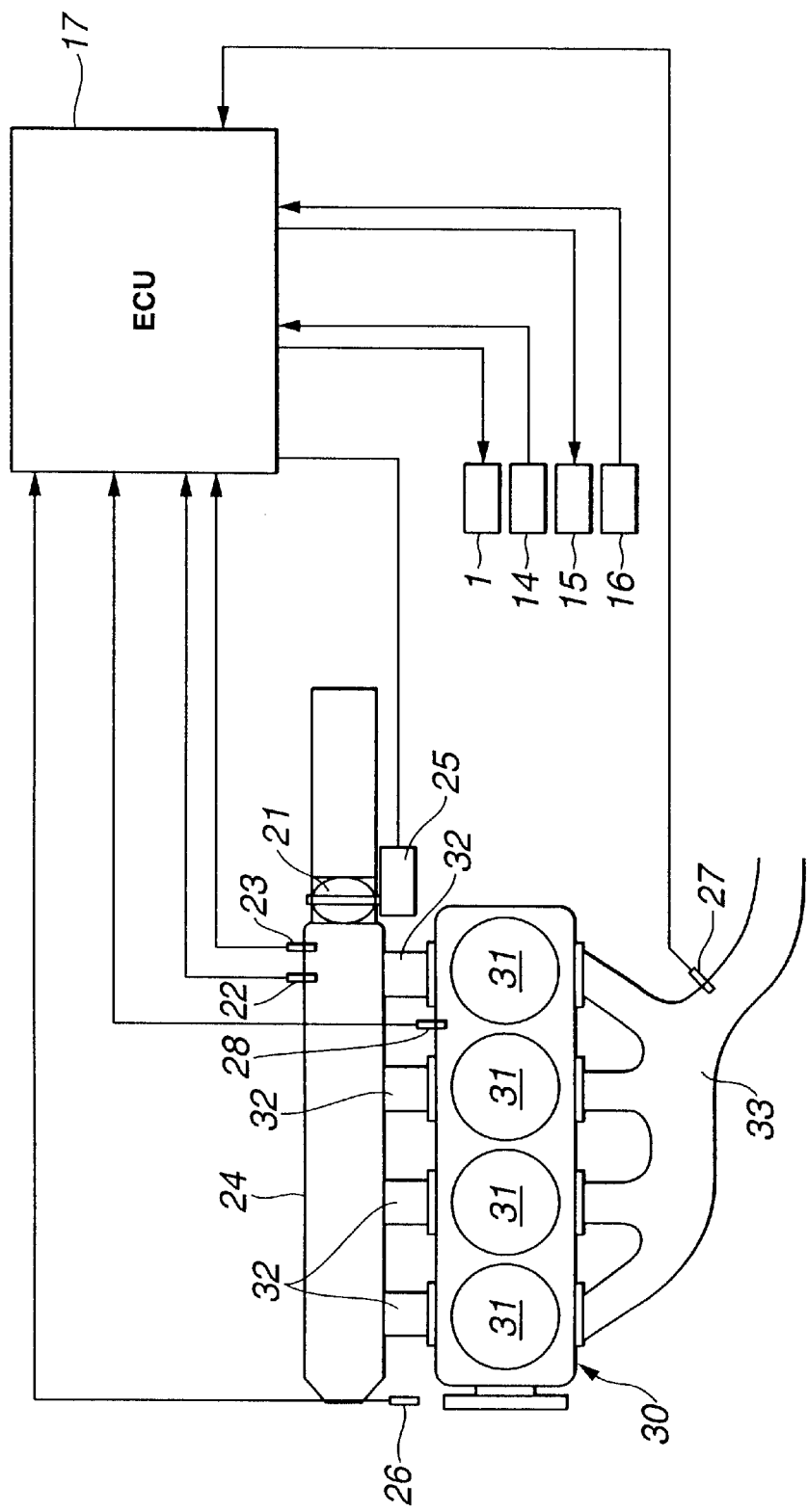
FIG. 4 is a schematic view showing an intake control system of the engine employed in the embodiment.

FIG. 4 show an engine control system including an intake air quantity measuring apparatus according to one embodiment of the present invention. In this embodiment, the engine is a four-cylinder internal combustion gasoline engine.

When, in a very light load region including an idling operation, the valve lift of an intake valve is reduced to a certain limit, the intake air flow is brought to a choked state, and the speed of the intake air flow through a gap formed by an intake valve approaches the speed of sound. In this choked state, a change in the intake valve timing can cause no or little change in the flow rate. The quantity of intake air flowing into an engine cylinder is determined basically by the intake valve lift alone. If, in a very low lift state (or minimum lift state) in which the intake valve lift is equal to or lower than the above-mentioned limit, the intake valve closing timing is advanced excessively to a point near top dead center (TDC), then the intake valve closes at such a timing that the piston stroke is still insufficient, and the combustion tends to deteriorate because of insufficient increase in the incylinder pressure and temperature near top dead center.

Specifically when fine adjustment of the intake air quantity is required in the very low lift state where the intake air quantity is very small, as in the case of an increase in the engine load from the idle state by drive of an accessory, the setting of fuel injection quantity and air-fuel ratio after the measurement of intake air quantity by an air flowmeter tends to incur a considerable delay from an actual increase in the intake air quantity to an increase in the fuel injection quantity, which could incur engine stall due to excessively lean condition.

In the very low lift state where the intake air quantity is very small, the rate of change of the air-fuel ratio with respect to the intake air quantity becomes greater as compared to the other engine operating states where the intake air quantity is greater, so that the accurate measurement of the intake air quantity is demanded. On the other hand, in the other engine operating states other than the very low lift state, the intake valve lift is so high that the intake air quantity is not changed so much by a change of the intake valve lift. Rather, the intake air quantity tends to change largely under the influence of intake pulsation due to changes in intake valve timing, i.e., intake valve opening timing and closing timing.

In view of this, the intake air quantity measuring apparatus according to this embodiment of the present invention is devised to measure and control the intake air quantity and fuel supply quantity accurately even in the very low lift state with a simplified construction which does not require a throttle valve and an air flowmeter.

A collector section 24 of the engine shown in FIG. 4 is provided at one side of a cylinder block 30. Collector section 24 is connected with four intake ports of four engine cylinders 31 arranged in a row, through four intake branches 32, respectively. A negative pressure regulating valve 21 is disposed in an intake passage on the upstream side of the collector section 24. Negative pressure regulating valve 21 is not a valve intended to regulate the engine intake air quantity, but a regulating valve designed to produce an intake negative pressure (or intake vacuum) used for blow-by and fuel vapor. That is, negative pressure regulating valve 24 is designed to produce a minimum negative pressure required by the engine.

An intake control section of this engine control system includes an intake valve operating angle altering mechanism 1 and a phase altering mechanism 15. Intake valve operating angle altering mechanism 1 is capable of continuously varying both of an intake valve operating angle (valve opening period) and a valve lift (herein referred to as lift operating angle). Phase altering mechanism 15 is capable of varying the phase of the center of the intake valve lift operating angle with respect to the phase of the crankshaft rotation. This engine control system can continuously vary the intake valve lift (quantity) and valve timing (opening timing and closing timing) with operating angle altering mechanism 1 and phase altering mechanism 15.

Thus, the engine control system according to this embodiment controls the intake air quantity by controlling the valve lift and valve timing. Moreover, the engine control system senses parameters corresponding to the valve lift and valve timing, and calculates the intake air quantity and fuel injection quantity accurately in accordance with the sensed parameters. In this way, the engine system can control the intake air quantity and fuel injection quantity accurately with a simple structure without requiring a throttle valve and an air flowmeter.

An ECU (engine control unit) 17 serving as a controller is a central component of the engine control system. ECU 17 includes a microcomputer having at least one memory and CPU for performing various engine control operations. Input information on engine operating conditions is inputted to ECU from a sensor (or input) section of the engine control system. In this example, the sensor section includes a pressure sensor 22 for sensing a pressure in collector section 24; a collector temperature sensor 23 for sensing a temperature in collector section 24; a crank angle sensor 26 for sensing an engine speed (rpm); an A/F sensor (or oxygen sensor) 27 for sensing an air-fuel ratio of an exhaust gas mixture in an exhaust passage 33 of the engine; and an engine temperature sensor 28 for sensing an engine temperature (or a temperature of engine coolant). The sensor section of this example further includes a control shaft angle sensor 14 and a drive shaft angle sensor 16, as explained later. These sensors are connected with ECU 17.

An actuator (or output) section of the engine control system of this example includes (an actuator 13 of) the operating angle altering mechanism 1, phase altering mechanism 15, and an actuator 25 of negative pressure regulating valve 21. ECU 17 controls these components of the actuator section by delivering control signals.

Figure 1:
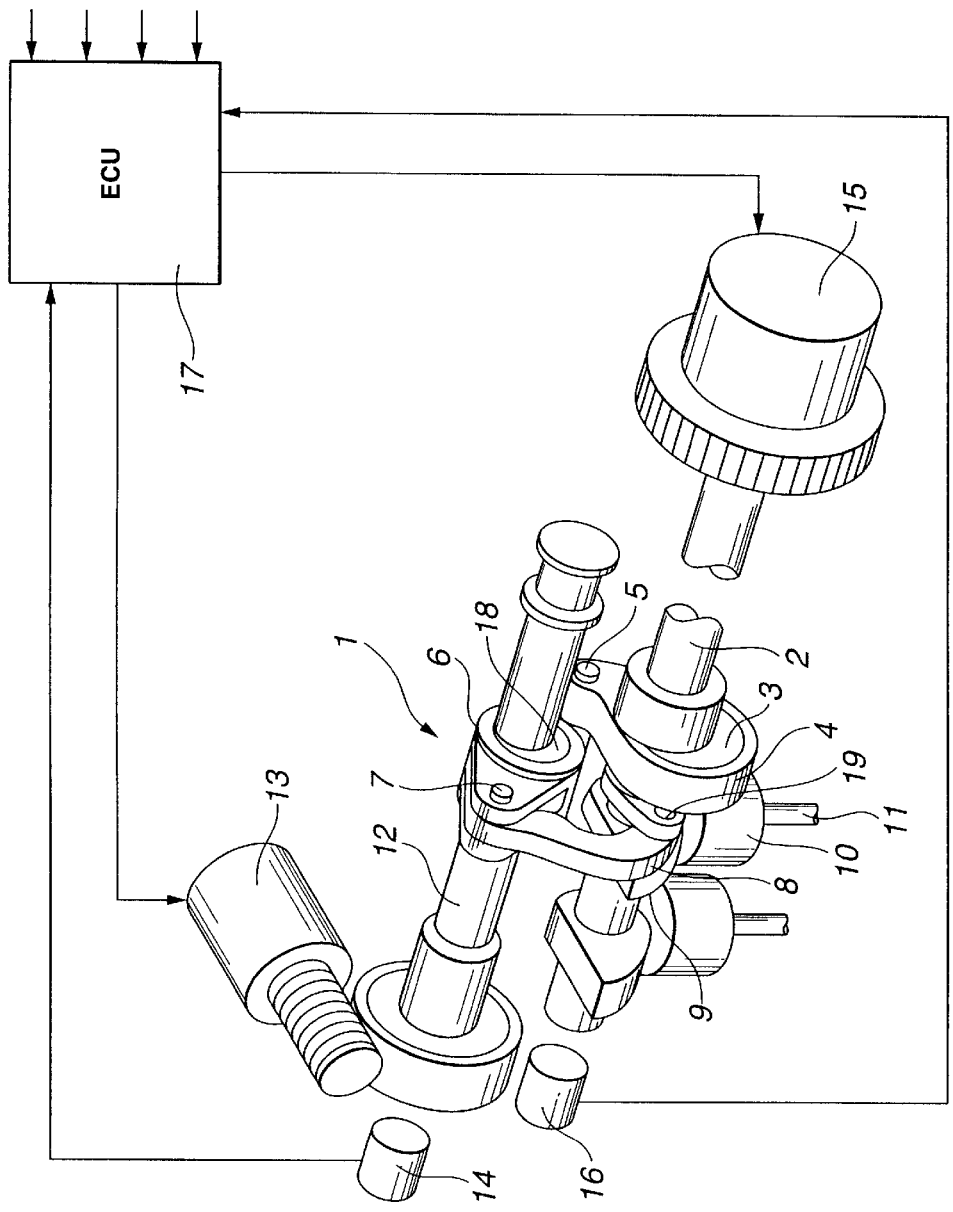
FIG. 1 is a schematic perspective view showing an operating angle altering mechanism and a phase altering mechanism employed in an intake system of an engine according to an embodiment of the present invention.

FIG. 1 shows the operating angle altering mechanism 1.

Above an intake valve 11, a drive shaft 2 extend in a direction of row of cylinders of the engine. Rotation of a crank shaft is transmitted to drive shaft 2. Therefore, drive shaft 2 rotates about its own axis in timed relationship with the crank shaft.

An eccentric cam 3 for each cylinder is fixedly or integrally formed on drive shaft 2 so that the center of the cam is off the center axis of drive shaft 2. A first link 4 shaped like a ring is fit over eccentric cam 3 in such a manner that first link 4 can rotate relative to eccentric cam 3. A control shaft 12 extends in parallel to drive shaft 2 in the cylinder row direction of the engine. A control cam 18 for each cylinder is fixedly or integrally formed on this control shaft 12 in such an eccentric manner that the center of the cam is off the center axis of control shaft 12. A center portion of a rocker arm 6 is rotatably fit over control cam 18, so that rocker arm 6 is rotatably mounted on control cam 18. Rocker arm 6 includes a first arm end connected with one end of first link 4 through a first connecting pin 5, and a second arm end connected with one end of a rod-shaped second link 8 through a second connecting pin 7. The other end of second link 8 is connected through a third connecting pin 19 with a projecting end of a rocker cam 9 rotatably mounted on drive shaft 2.

When drive shaft 2 is driven by the crank shaft, drive shaft 2 rotates, and eccentric cam 3 mounted on this rotating shaft 2 causes first link 4 to move up and down as viewed in FIG. 1, approximately in a manner of translational motion. This translational motion of first link 4 is then converted to swing motion of rocker arm 6, and second link 8 causes rocker cam 13 to swing about the center axis of drive shaft 2. This rocker cam 9 abuts against and pushes down a valve lifter 10 for intake valve 11, and thereby opens intake valve 11 against the force of a valve spring of the intake valve.

An actuator 13 is constructed to rotate control shaft 12 in accordance with engine operating condition, and thereby to shift the center of control cam 18. By thus shifting the center of control cam 18 about which rocker arm 6 swings, actuator 13 can change the attitudes of rocker arm 6 and links 4 and 11, and alter the swing characteristic of rocker cam 13. In this way, actuator 13 can continuously vary the operating angle and valve lift quantity of intake valve 11.

In the thus-constructed operating angle altering mechanism, rocker cam 9 is mounted coaxially on drive shaft 2. This coaxial arrangement is advantageous in preventing misalignment or maladjustment of rocker cam 9 and drive shaft 2, and hence superior in control accuracy. Moreover, rocker arm 6 and links 4 and 8 are arranged closely around the valve drive shaft 2, to the advantage to the compactness of the operating angle altering mechanism. Most of members are in contact with one another over an area. This construction is advantageous in lubrication, durability and reliability. For example, the bearing interface portion between eccentric cam 3 and first link 4, and the bearing interface portion between control cam 18 and rocker arm 6 have substantial contact areas.

When this altering mechanism is applied to an ordinary direct drive type valve operating system having a fixed cam and cam shaft, the application is very easy because the fixed cam and cam shaft can be replaced by rocker cam and valve drive shaft with no or little change in the layout.

Phase altering mechanism 15 varies the phase of drive shaft 2 with respect to the crank shaft, and thereby continuously vary the phase of the center of the intake valve lift operating angle. Among known phase altering mechanisms, there are a type using vane, and a type using helical splines.

Control shaft angle sensor 14 is arranged to sense the angle of control shaft 12 corresponding to the operating angle and valve lift of intake valve 11. Drive shaft angle sensor 16 is arranged to sense the angle of drive shaft 2 corresponding to the phase of the center (center phase) of the operating angle of intake valve 11.

In the system including both the operating angle altering mechanism 1 for varying the intake valve operating angle and valve lift and the phase altering mechanism 15 for varying the center phase of the operating angle, the operating angle and valve lift can be altered only by operating angle altering mechanism 1. On the other hand, the valve timing is altered by either of operating angle altering mechanism 1 and phase altering mechanism 15. In this embodiment, the control system can sense the parameter corresponding to the valve timing (valve opening point and valve closing point) indirectly in accordance with the sensed control shaft angle corresponding to the operating angle and the sensed drive shaft angle corresponding to the center phase.

Figure 2:
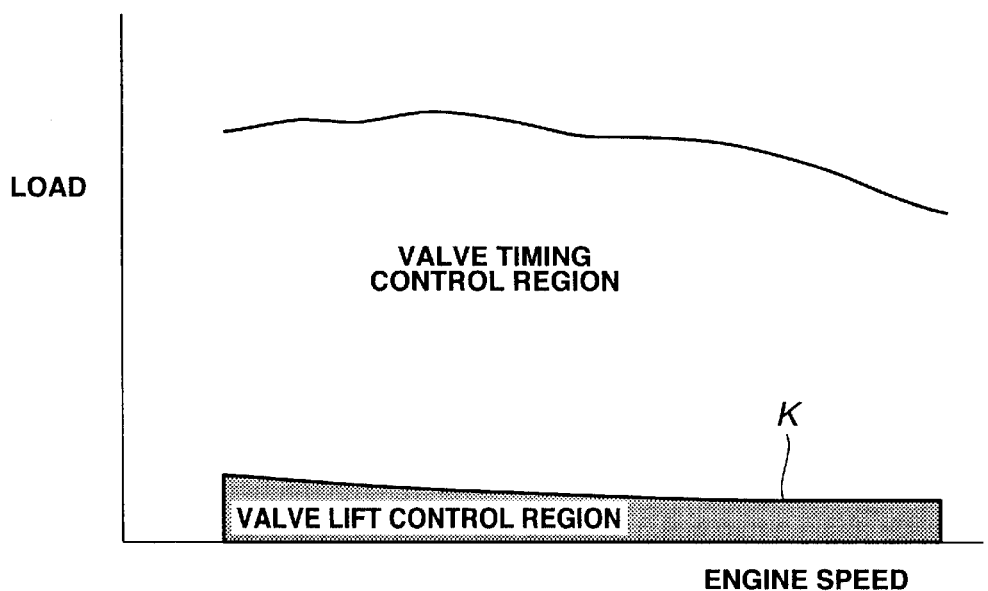
FIG. 2 is a graph illustrating two different control regions employed in the embodiment.

FIG. 2 shows two operating regions of different control modes employed in this embodiment. FIG. 3 shows settings of intake valve lift operating angle and center phase in various engine operating states in this example.

As shown in the uppermost row in FIG. 3, in the very low load region (corresponding to a valve lift control region shown in FIG. 2) including an idle region, the required intake air quantity is very small, and hence the control system sets a very low lift state in which the intake valve lift operating angle is equal to or lower than a lift operating angle limit, with operating angle altering mechanism 1.

When the valve lift is reduced into the very low lift state, the speed of the flow approaches the speed of sound, and the fluid flow in the gap of the intake valve is brought to the choked state. In such a state, a change in the intake valve timing causes no or little change in the flow rate. Therefore, the intake air quantity of the intake air flowing into the cylinder is basically determined only by the amount of the valve lift.

In the very low lift state corresponding to the very light load region, therefore, the control system controls the intake air quantity and fuel injection quantity by using the valve lift as a main parameter. The control system calculates the intake air quantity in accordance with the valve lift sensed (estimated) by using control shaft angle sensor 14 and crank angle sensor 26, and the engine speed, and further calculates the fuel injection quantity in accordance with this intake air quantity.

In the very low lift state below the valve lift limit, if the intake valve closing timing is advanced excessively toward top dead center (TDC), the intake valve is closed in the state in which the piston stroke is insufficient, and the incylinder pressure and temperature could not rise sufficiently near top dead center. Therefore, excessive advancement of the intake valve closing timing toward top dead center (TDC) could deteriorate the combustion. In order to ensure the effective compression ratio and stabilize the combustion in the very low lift state, the intake valve closing timing is retarded to a point near bottom dead center. In this example, the center phase is retarded to or near the most retarded phase by phase altering mechanism 15. In this very low lift state, the valve lift is used as the main parameter for the control, so that there is no possibility that the phase of the center of the lift operating angle is advanced too much by phase altering mechanism 15.

Moreover, this control system employs a minus overlap setting in the very low lift state. In the minus overlap setting, the intake valve opening timing is retarded widely from top dead center and from the exhaust valve closing timing. This minus overlap setting is intended to improve the combustion by increasing the effective compression ratio. Variation in the residual gas quantity is small as compared to the ordinary valve overlap, so that the accuracy in the correction based on the residual gas quantity can be improved.

As shown in the second through sixth rows in FIG. 3, in regions (valve timing control region) in which the load is heavier than the very light load region in the uppermost first row in FIG. 3, the combustion is stable enough. Therefore, the operating angle and valve lift can not be set lower than the above-mentioned limit, and the above-mentioned choked state can not arise. Therefore, the intake air quantity is not influenced so much by changes in the valve lift. Rather, the intake air quantity tends to be varied largely by influence of intake pulsation due to changes in intake valve timing. Therefore, the control system according to this embodiment controls the intake air quantity and fuel injection quantity by using the valve timing as a main parameter in the engine operating regions other than the very low lift state corresponding to the very light load region. The control system controls the operating angle altering mechanism 1 and phase altering mechanism 15 so as to achieve a valve timing determined in accordance with the engine operating conditions to reduce the pumping loss. Moreover, the control system accurately calculates the base intake air quantity in accordance with the valve timing (the operating angle and center phase) sensed indirectly by the sensors 14 and 16, and the engine speed, and determines the fuel injection quantity accurately in accordance with the thus-determined intake air quantity.

In the light load region shown in the second row in FIG. 3, the control system of this example reduces the induction resistance by slightly increasing the valve lift and operating angle in compliance with the stabilization of combustion, and reduces the pumping loss to improve the fuel efficiency by advancing the intake valve closing timing from bottom dead center by advancement of the center phase.

When the operating point shifts from the very light load region to the light load region as in the case when an accessory unit such as an air conditioner is switched on in the idling state, the intake air quantity is hardly changed by alteration of the center phase alone. In this case, the control system increases the valve lift quickly by driving the operating angle altering mechanism 1 first, and thereby improves the stability of combustion in the transient state.

In the medium load region shown in the third row of FIG. 3, the stability of the combustion is further improved as compared to the light load region. Therefore, the control system further increases the valve lift and advances the center phase. Moreover, the intake valve opening timing is advanced beyond top dead center and exhaust valve closing timing, to provide valve overlap to improve the combustion with internal EGR and to reduce the pumping loss. As shown in the lower three rows in FIG. 3, in the heavy load region including the maximum torque region (full open region), the operating angle is increased as the engine speed increases.

A boundary K between the valve lift control region and the valve timing control region shown in FIG. 2 shifts in dependence on the combustion stability state. Therefore, by adjustment based on incylinder pressure, torque variation, and unburnt fuel attached to the intake valve, it is possible to expand the valve timing control region of low pumping loss without regard to various irregularities. Fuel atomization and temperature in compression stroke exert significant influence on the combustion state. Therefore, the correction based on the engine temperature sensed by temperature sensor 28 is specifically effective.

The control system according to this embodiment regulates the intake air quantity by controlling the intake valve lift and valve timing in accordance with engine operating conditions, and calculates the intake air quantity and fuel supply quantity in accordance with the sensed valve lift and timing. Therefore, by eliminating the need for a throttle valve and an air flowmeter, the control system of this embodiment can reduce the number of required parts, and simplify the control process and structure. Moreover, the control system can prevent induction pulsation and reduce throttle loss due to throttling operation of a throttle valve.

Specifically in the very low lift state as in the very light load operating region including idling, in which the intake valve lift is very low and the intake air quantity is hardly changed by changes in the valve timing, the control according to this embodiment is based mainly on the amount of valve lift. In other words, the control system varies the valve lift to regulate the intake air quantity by driving the operating angle altering mechanism 1, and calculates the base intake air quantity and fuel injection quantity in accordance with the valve lift sensed by the sensor section. In the very low lift state, therefore, the control system can control the intake air quantity and fuel injection quantity quickly and accurately. In such a very light load region, the valve lift is varied preferentially. Therefore, the control system can prevent an undesired decrease in the compression ratio due to excessive advancement of the intake valve closing timing, reduce the pulsation of intake flow in the intake passage, and hence calculate (or predict) the intake air quantity accurately on the basis of the valve lift.

In a transient state in which the engine load is increased from the very light load region, as caused when an accessory is driven at idling, the operating angle altering mechanism 1 is driven preferentially to increase the valve lift preferentially. Therefore, this control system can increase the intake air quantity and fuel injection quantity quickly and accurately in such a transient state, and thereby reduce a deviation of the actual air-fuel ratio from a desired air-fuel ratio responsively.

Figures 5A, 5B:
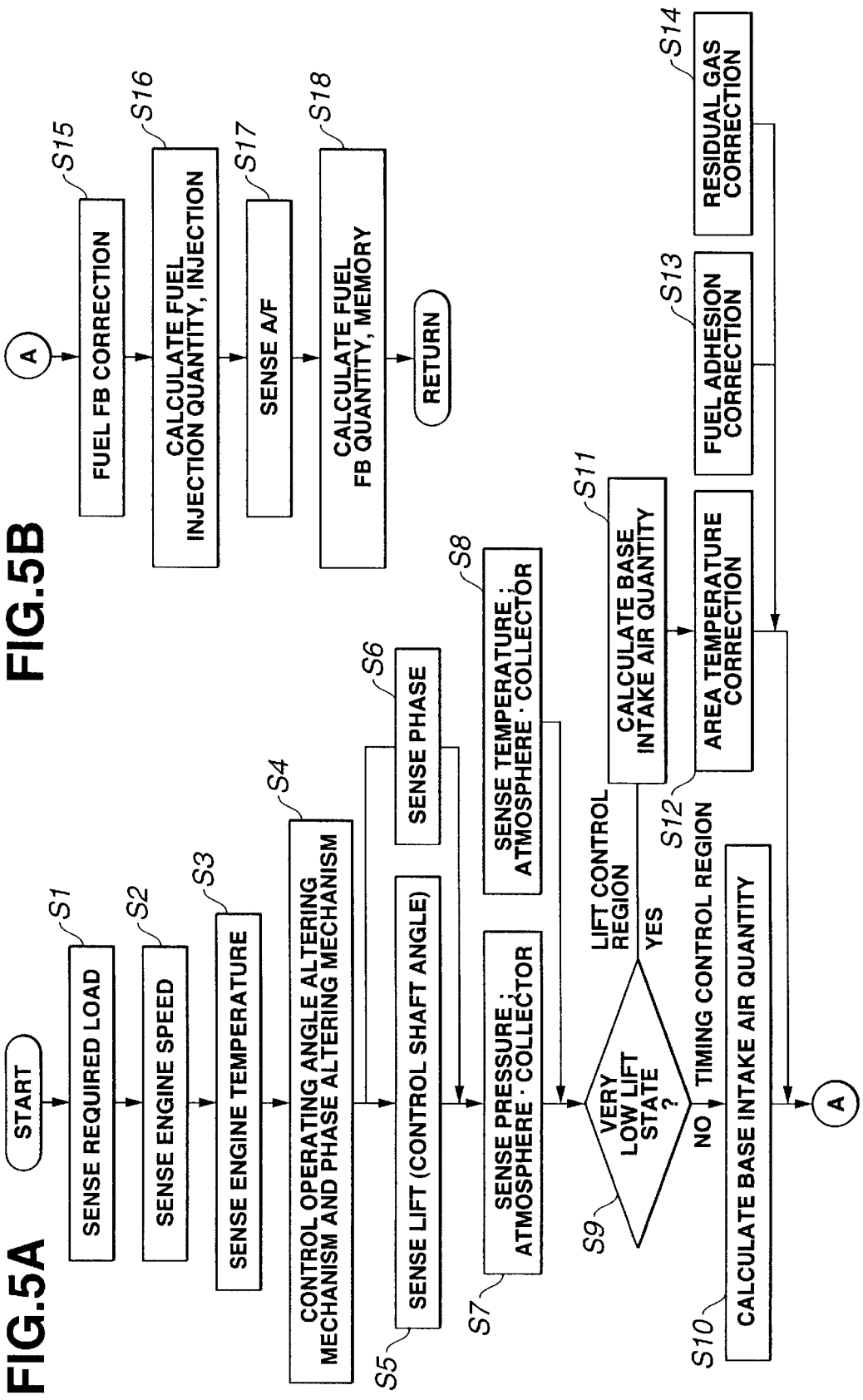
FIGS. 5A and 5B show a control flow employed in the embodiment.

FIGS. 5A and 5B show a control flow according to this embodiment. After sensing a required load of the accessories, the control system controls operating angle altering mechanism 1 and phase altering mechanism 15 so as to achieve desired lift operating angle and desired center phase to meet the required load at step S4. The above-mentioned desired lift operating angle and desired center phase are modified in accordance with the engine speed ascertained at step S2, and the engine temperature ascertained at step S3.

At a section of steps S5 and S6, the intake valve lift operating angle (the operating angle and valve lift) is sensed by control shaft angle sensor 14, and the center phase of the intake valve operating angle is sensed by drive shaft angle sensor 16. In this example, these signals from the sensors 14 and 16 are used to control the lift operating angle and center phase accurately in a feedback control mode.

At a section of steps S7 and S8 following the section of steps S5 and S6, the pressure and temperature in collector section 24 are sensed by pressure sensor 22 and collector temperature sensor 23.

Step S9 is a step for examining whether the engine operating point is in the very low lift state or not, that is whether the operating point is in the valve lift control region or in the valve timing control region, in accordance with the engine load and engine speed by using a control map as shown in FIG. 2. When the engine operating point is in the valve timing control region, the control system proceeds to step S11, senses (or estimates) the intake valve timing in accordance with the sensor signals from control shaft angle sensor 14 and drive shaft angle sensor 16, and determines the base intake air quantity in accordance with the sensed intake valve timing and engine speed.

When the engine operating point is in the valve lift control region, the control system proceeds from step S9 to S11, calculates the base intake air quantity mainly in accordance with the sensed valve lift and engine speed, and performs various corrective operations of steps S12~S14. The corrections are: an area temperature correction (S12) which is a minimum correction for modifying the valve lift influenced by the engine temperature; a valve-adhering fuel quantity correction (S13) for modifying a minimum passage area influenced by a quantity of fuel adhering to intake valve 11; and a residual gas quantity correction (S14) for compensating for a change in a residual gas quantity due to a change in the valve overlap (minus overlap) determined by the valve timing. In the very low light load region including idle region, the control system of this example provides a minus valve overlap by setting the intake valve opening timing later than the exhaust valve closing timing, in order to stabilize the residual gas quantity. Therefore, the control system can estimate the residual gas quantity accurately and improve the accuracy of correction in the intake air quantity based on the residual gas quantity. It is possible to vary the base intake air quantity per se in accordance with the pressure and temperature sensed at steps S7 and S8, or to employ a corrective term by holding the base intake air quantity unchanged. The control system of this example performs a correction based on a parameter representing the density of intake air. The pressure and temperature in collector section 24 are used as the parameter representing the intake air density. The flow rate determined by the intake valve lift is a volume flow rate whereas the fuel injection quantity should be determined on the basis of a mass flow rate of the intake air. Therefore, the correction based on the intake air density is effective.

On the basis of the intake air quantity calculated and modified at steps S10 or S11~S14, the control system calculates the fuel injection quantity and performs fuel injection at step S16 shown in FIG. 5B. Moreover, the control system of this example controls the fuel injection quantity in a feedback control mode based on the exhaust air-fuel ratio, to compensate for a deviation in the fuel injection quantity due to changes in the valve clearance with time. In this example, step S17 senses the exhaust air-fuel ratio with exhaust A/F sensor 27, and step S18 calculates a fuel feedback quantity in accordance with the sensed exhaust air-fuel ratio, and stores the fuel feedback quantity in a memory. At the time of next fuel injection, the fuel feedback quantity is used to correct the fuel injection quantity at step S15.

In this embodiment, at least one of the mechanisms 1 and 15 can serve as means for continuously controlling the intake air quantity by varying the intake valve operating characteristic. Sensor 26 can serve as means for sensing the engine speed. Sensor 14 can serve as means for sensing the intake valve lift. Digital computer in ECU 17 can serve as means for discriminating the very light engine load region, and means for calculating the intake air quantity in a first control mode at step S10, and means for calculating the intake air quantity in a second control mode at step S11. ECM 17 can serve as a controller for detecting the very light load region or judging whether the current intake valve lift is equal to or lower than the predetermined value, to discriminate the very low lift state from the other operating states. Sensor 26 can serve as a first sensor to sense the engine speed, and sensor 14 can serve as a second sensor to sense the intake valve lift.

This application is based on a prior Japanese Patent application No. 2001-51423. The entire contents of this Japanese Patent Application No. 2001-51423 with a filing date of Feb. 27, 2001 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An engine control system comprising:
   means for continuously controlling an intake air quantity of an engine by varying an intake valve operating characteristic;
   means for sensing an engine speed of the engine;
   means for sensing an intake valve lift of the engine;
   means for discriminating a very light engine load region from a remaining engine operating region;
   means for calculating an intake air quantity in a first control mode in the case of the remaining engine operating region; and
   means for calculating the intake air quantity in a second control mode in accordance with the engine speed and the intake valve lift in the case of the very light engine load region.

2. An intake air quantity measuring method for an engine arranged to continuously control an intake air quantity by varying an intake valve operating characteristic, the intake air quantity measuring method comprising:
   sensing an engine speed of the engine;
   sensing an intake valve lift of the engine;
   detecting a very light engine load region; and
   calculating an intake air quantity in accordance with the engine speed and the intake valve lift when the very light engine load region is detected.

3. The intake air quantity measuring method as claimed in claim 2, wherein the intake air quantity measuring method further comprises:
   sensing an engine temperature of the engine; and
   correcting the intake air quantity in accordance with the engine temperature.

4. The intake air quantity measuring method as claimed in claim 2, wherein the intake air quantity measuring method further comprises:
   correcting the intake air quantity in accordance with an estimated amount of fuel adhering to an intake valve.

5. The intake air quantity measuring method as claimed in claim 2, wherein the intake air quantity measuring method further comprises:
   sensing a parameter related to a density of an intake fluid; and
   correcting the intake air quantity in accordance with the parameter.

6. The intake air quantity measuring method as claimed in claim 2, wherein the intake air quantity measuring method further comprises:
   correcting the intake air quantity in accordance with an estimated amount of residual burnt gases remaining in a combustion chamber.

7. The intake air quantity measuring method as claimed in claim 2, wherein the intake air quantity measuring method further comprises:
   sensing a phase of a center of an intake valve lift operation; and
   calculating the intake air quantity in accordance with the engine speed, the intake valve lift and the phase of the center when a current intake valve lift of the engine is greater than a predetermined lift value.

8. The intake air quantity measuring method as claimed in claim 2, wherein the very light engine load region is a region in which a current intake valve lift of the engine is equal to or smaller than a predetermined lift value, and the very light engine load region is detected by examining whether the current intake valve lift of the engine is equal to or smaller than the predetermined lift value.

9. The intake air quantity measuring method as claimed in claim 8, wherein the very light engine load region is a region in which the intake air quantity is not influenced by variation in a phase of an intake valve lift characteristic.

10. The intake air quantity measuring method as claimed in claim 8, wherein the predetermined lift value is a lift value at which a speed of intake air at an intake valve reaches a sonic speed.

11. An intake air quantity measuring apparatus for an engine arranged to continuously control an intake air quantity by varying an intake valve operating characteristic, the intake air quantity measuring apparatus comprising:
    a first sensor to sense an engine speed of the engine;
    a second sensor to sense an intake valve lift of the engine; and
    a controller programmed
    to detect a very light engine load region; and
    to calculate an intake air quantity in accordance with the engine speed and the intake valve lift when the very light engine load region is detected.

12. The intake air quantity measuring apparatus as claimed in claim 11, wherein the measuring apparatus further comprises:
    a collector section connected with intake ports of engine cylinders of the engine;
    a negative pressure regulating valve disposed on an upstream side of the collector section, and arranged to regulate a negative pressure in the collector section;
    a third sensor to sense a pressure in the collector section; and
    a fourth sensor to sense a temperature in the collector section;
    wherein the controller is further programmed to correct the intake air quantity in accordance with the pressure and temperature sensed by the third and fourth sensors.

13. The intake air quantity measuring apparatus as claimed in claim 11, wherein the measuring apparatus further comprises a sensor to sense an air-fuel ratio of an exhaust gas mixture of the engine; and the controller is further programmed to calculate a fuel injection quantity in accordance with a result of the calculation of the intake air quantity, and to correct the fuel injection quantity in accordance with the air-fuel ratio of the exhaust gas mixture.

14. The intake air quantity measuring apparatus as claimed in claim 11, wherein the intake air quantity measuring apparatus further comprises a sensor to sense an engine temperature of the engine; and the controller is further programmed to correct the intake air quantity in accordance with the engine temperature.

15. The intake air quantity measuring apparatus as claimed in claim 11, wherein the controller is further programmed to correct the intake air quantity in accordance with an estimated amount of fuel adhering to an intake valve.

16. The intake air quantity measuring apparatus as claimed in claim 11, the intake air quantity measuring apparatus further comprises a sensor to sensor an intake valve timing of the engine, and the controller is programmed to calculate the intake air quantity in accordance with the engine speed and the intake valve timing when the very light load region is not detected.

17. The intake air quantity measuring apparatus as claimed in claim 11, wherein the controller is programmed to correct the intake air quantity in accordance with an amount of residual burnt gases remaining in a combustion chamber which is estimated in accordance with a valve overlap.

18. The intake air quantity measuring apparatus as claimed in claim 17, wherein the controller is programmed to retard an intake valve opening timing so that the intake valve opening timing is later than an exhaust valve closing timing in the very light engine load region.

* * * * *